United States Patent [19]

Wyss

[11] 4,183,560
[45] Jan. 15, 1980

[54] ARRANGEMENT FOR MAKING A SPIGOT-AND-SOCKET JOINT SECURE FROM SLIDING

[75] Inventor: Walter Wyss, Matzendorf, Switzerland

[73] Assignee: H. Heer & Co., Olten, Switzerland

[21] Appl. No.: 872,774

[22] Filed: Jan. 27, 1978

[30] Foreign Application Priority Data

Jan. 27, 1977 [CH] Switzerland .................. 1003/77
Dec. 20, 1977 [CH] Switzerland .................. 15679/77

[51] Int. Cl.² .......................................... F16L 21/04
[52] U.S. Cl. .................................. 285/232; 285/328; 285/348; 285/356; 285/368; 285/374; 285/414
[58] Field of Search .............. 285/348, 356, 322, 323, 285/337, 342, 343, 414, 415, 363, 368, 374, 328, 232

[56] References Cited

U.S. PATENT DOCUMENTS

| | | | |
|---|---|---|---|
| 1,209,887 | 12/1916 | Rothenbucher | 285/414 X |
| 1,982,044 | 11/1934 | Clark | 285/368 X |
| 2,282,738 | 5/1942 | Moore | 285/348 X |
| 2,935,342 | 5/1960 | Seamark | 285/415 X |
| 3,891,294 | 6/1975 | Philibert | 285/342 X |

FOREIGN PATENT DOCUMENTS

| | | | |
|---|---|---|---|
| 551768 | 6/1932 | Fed. Rep. of Germany | 285/337 |
| 2417895 | 10/1975 | Fed. Rep. of Germany | 285/374 |

Primary Examiner—Dave W. Arola
Attorney, Agent, or Firm—Watson, Cole, Grindle & Watson

[57] ABSTRACT

A spigot and socket connection of the type which comprises a pipe end held within a socket by means of a retaining ring includes a device for securing the connection against sliding of the components. This device comprises a sleeve-like securing element lying between the pipe end and the retaining ring. The securing element carries an abutment which is engaged by the retaining ring, and the element is securely clamped to the external surface of the pipe end.

19 Claims, 8 Drawing Figures

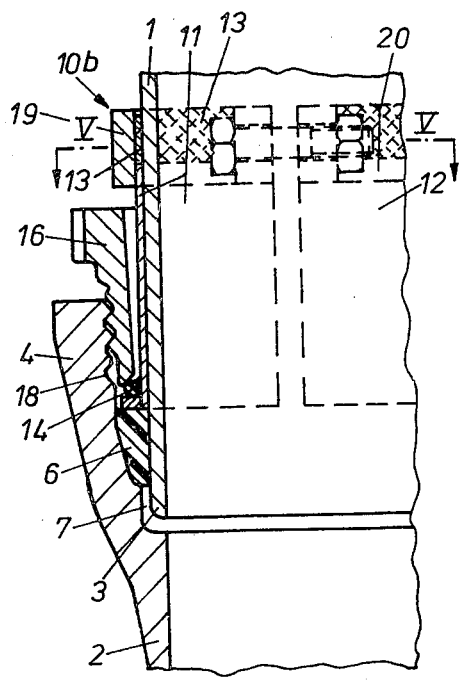
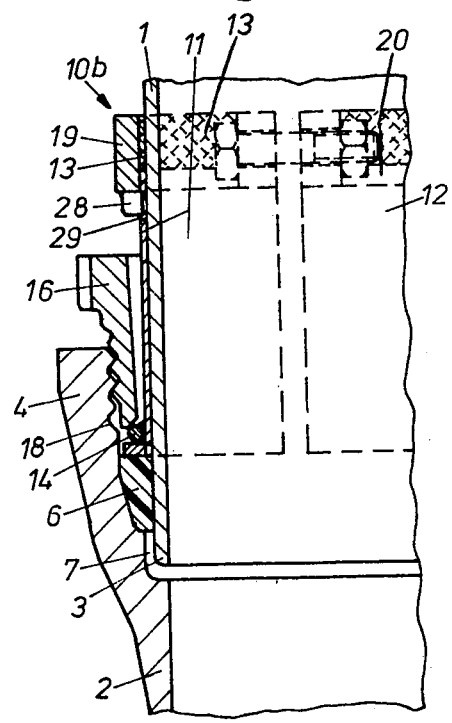
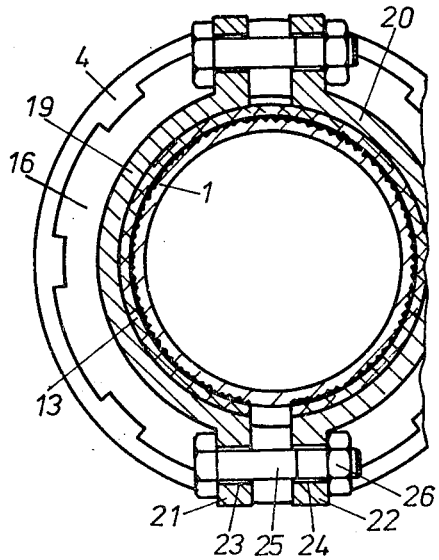
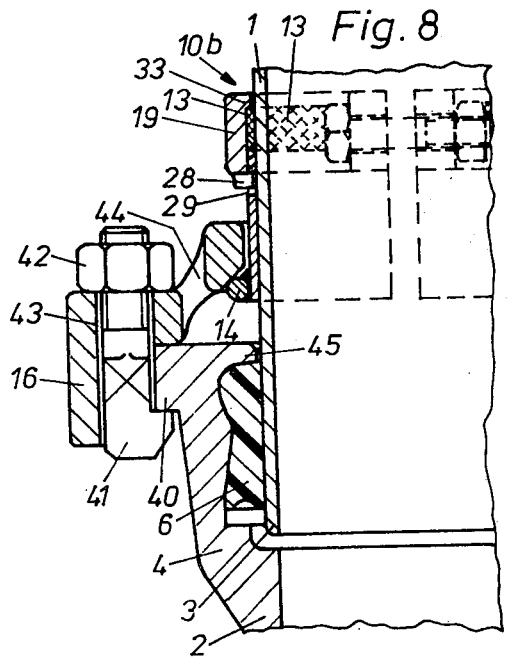

ARRANGEMENT FOR MAKING A SPIGOT-AND-SOCKET JOINT SECURE FROM SLIDING

BACKGROUND OF THE INVENTION

1. Field of the Invention

The present invention relates to an arrangement for making secure from sliding a spigot-and-socket joint for the connection of a pipe end with the socket end of a connecting pipe, which joint utilizes a securing ring axially held on the socket end and with a seal in the base of the socket.

2. The Prior Art

Non-sliding arrangements for spigot-and-socket joints are known in various forms of construction. As regards these, two groups may essentially be distinguished. In a first group of non-sliding arrangements the spigot-and-socket joint is held together by means of a clamp divided into two parts along the direction of the tube axis, this clamp surrounding the spigot-and-socket joint on the external side and being supported on the external periphery of the so-called spigot end of the one pipe and on the external periphery of the socket of the other pipe.

In the second group of spigot-and-socket joints a securing ring is used, this ring, and/or the sealing parts lying at the base of the socket, being so constructed that they can absorb pushing forces acting on the spigot-and-socket joint.

The main task of a non-sliding arrangement without doubt consists of ensuring as reliable as possible an absorption of pushing forces, but the properties afforded by spigot-and-socket joints, i.e. the deflectability and the electric connection of the pipe ends, should at the same time be preserved. In addition, a simple and easy laying of the pipes should be afforded.

The known non-sliding arrangements of both the first and second groups are not in a position to fulfil all the requirements mentioned above. With the non-sliding arrangements of the first group, the deflectability of the tubes is not ensured in the case of the majority of forms of construction. Additionally, since the pipe clamps used are relatively thick-walled, they can be fitted to the external diameter only with difficulty, as they must have an internal diameter which corresponds at least to the largest possible pipe diameter. For this reason provision is made externally for abutments which, e.g., are constructed at the so-called spigot end as a weld bead, at the socket end as an external collar.

With the non-sliding arrangements of the second group, the securing ring may be used to absorb the pushing forces when it is held in axial direction at the socket end. This is the case in particular with the securing ring constructed nowadays mostly as a screw-on ring. The screw-on ring has an external coarse thread which can be screwed in a counterthread arranged on the internal side of the socket. If the securing ring is designed as a press-on ring, it is held in axial direction by means of screws disposed in the socket end. With the securing ring thus constructed, pushing forces can indeed be absorbed, but considerable difficulties are caused when endeavoring to connect those parts which are used for the non-sliding arrangement with the pipe having the so-called spigot end in such a way that this pipe is held non-slidably in the socket. In a known method of construction a clamping ring, which has been slit and is then disposed in the base of the socket is used, which is supported by means of a slanting or arched surface on a slanting surface of the screw-on ring. By means of the slanting surface, a radial force is to be exerted on the clamp ring which thereby is pressed with its internal periphery which has a roughening or grooving onto the external periphery of the pipe with the spigot end. Although the clamp ring is constructed to be flexible by means of additional recesses extending along the direction of the pipe axis, a clamping of the pipe secure from sliding is not achieved, because on the one hand the clamping surface of the clamp ring restricted in its constructional height cannot be kept sufficiently great, and on the other hand the radial force exerted by the screw-on ring is considerably reduced by friction. The other conditions which are to be laid upon a good spigot-and-socket joint are fulfilled by this known construction, i.e., retaining the normal socket pipe dimensions and deflectability of the pipes. However, the non-sliding arrangement itself, as already mentioned, is not completely reliable.

Accordingly, the object of the invention is to construct a non-sliding arrangement of the type first defined above in such a manner that the retaining of the normal socket dimensions, the deflectability of the pipes and also the electric connection between the pipes are ensured, while in addition a satisfactory non-sliding arrangement is achieved.

SUMMARY OF THE INVENTION

This object is achieved according to the invention in that, between the external periphery of the pipe end of the pipe and the internal periphery of the securing ring, a securing part in the form of a sleeve is arranged whose end facing the seal forms an abutment for the securing ring and whose section protruding out of the securing ring at the opposite end can be clamped securely onto the tube by means of a clamping device.

DESCRIPTION OF THE DRAWINGS

The invention will now be understood by reference to the attached drawings and to the following description.

In the Drawings:

FIG. 5 shows a longitudinal section through a spigot-and-socket joint according to a further embodiment of a non-sliding arrangement according to the present invention;

FIG. 6 shows a section through the spigot-and-socket joint along line V—V in FIG. 5;

FIG. 7 shows a longitudinal section through a spigot-and-socket joint according to a further embodiment of a non-sliding arrangement according to the present invention; and FIG. 8 shows a longitudinal section through an embodiment of a non-sliding arrangement for a plug-in socket connection.

DETAILED DESCRIPTION OF THE PREFERRED EMBODIMENTS

Figure 3:
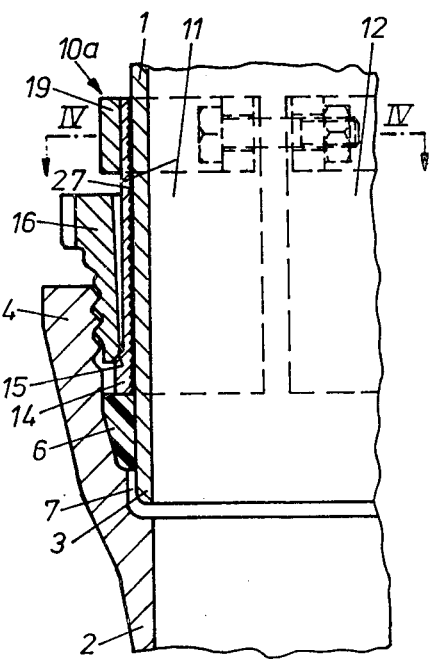
FIG. 3 shows a longitudinal section through a spigot-and-socket joint according to a further form of embodiment of a non-sliding arrangement according to the present invention.

In the Figures, two pipes 1, 2 are partly represented; of these, pipe 1 has a so-called spigot end 3 and the other pipe 2 has a socket end 4. At the base 5 of the socket end 4 a soft sealing ring 6 is inserted which seals the gap 7 formed between the spigot end 3 and the socket end 4. On the side opposite to the gap side of the sealing ring 6 a supporting ring 8 is disposed, which acts to compress the soft sealing ring 6. In FIG. 3 the supporting ring 8 is missing, but it could be used in this embodiment also.

The external periphery of the spigot end 3 of the pipe 1 is surrounded by a securing element 10 in the form of a sleeve which consists of two half cups 11, 12. The half cups 11, 12 have a collar 14 at their ends facing the seal, including slanting or arched shoulders 15 onto which a securing ring 16, which is designed as a screw-on ring, is supported. The securing ring 16 is provided with an external coarse thread 17 which is screwed into a corresponding internal thread 18 of the socket end 4. The end of the securing element 10 protruding out of the screw-on ring 16 is constructed as a clamp, whose portions 19, 20 form in each instance with the half cups 11, 12 one-piece constructional elements. The clamp portions 19, 20 have tensioning lugs 21, 22, each with a perforation 23, 24, through each of which a screw bolt 23 with a nut 26 passes, by means of which screws the clamp portions 19, 20 are pressed against the external periphery of the pipe 1. So that the half cups 11, 12 effect as good as possible a friction closure with the external surface of the pipe, the internal surfaces of the half-cups 11, 12 are provided with a roughening or friction grooving 27.

Figure 1:
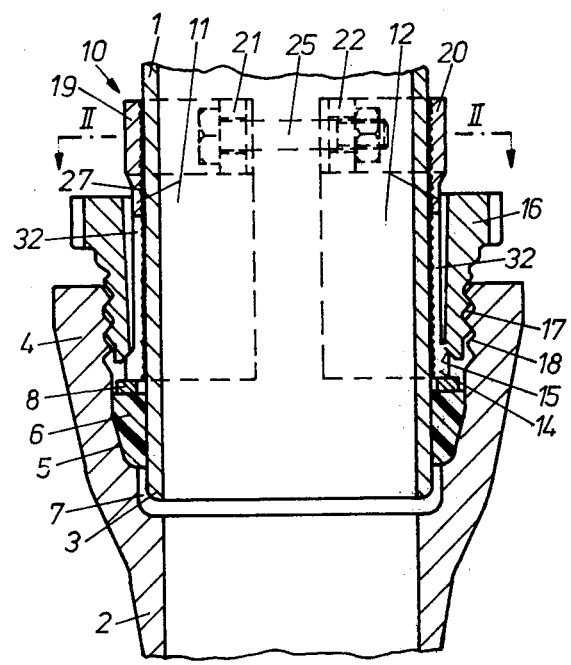
FIG. 1 shows a longitudinal section through a spigot-and-socket joint according to a first embodiment of a non-sliding arrangement according to the present invention.
Figure 2:
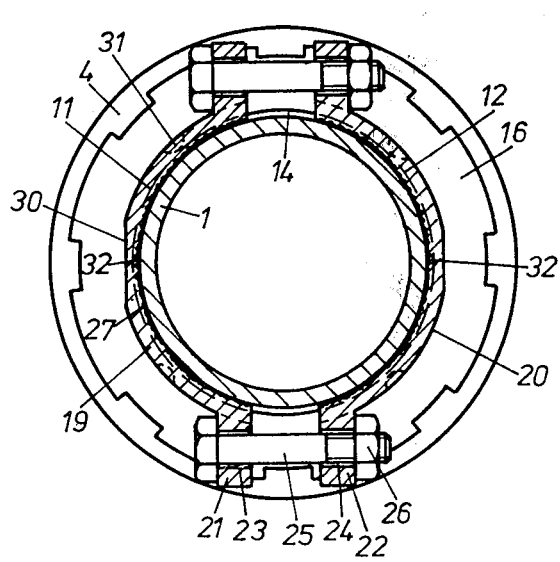
FIG. 2 shows a section through the spigot-and-socket joint along line II—II in FIG. 1.
Figure 4:
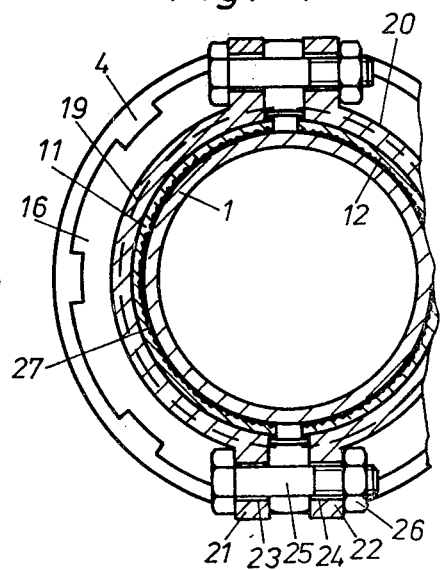
FIG. 4 shows a section through the spigot-and-socket joint along line IV—IV in FIG. 3.

In FIGS. 3 and 4, the parts which correspond to those of FIGS. 1 and 2 are similarly denoted and will not be further explained. The securing element 10a is distinguished from the securing element 10 according to FIGS. 1 and 2 only in that the clamp portions 19, 20 and the half-cups 11, 12 are not formed as one piece, but instead are separate from each other. The remainder of the construction of the securing element 10a is the same as in the embodiment according to FIGS. 1 and 2.

So that the clamping effect of the clamp portions 19, 20 is influenced as little as possible by the external diameter tolerances of pipe 1, it is possible to provide the clamp portions with elements extending axially parallel, permitting greater flexibility. These are according to FIG. 2 flat areas 30 or recesses 31 which have been represented only in dotted lines. Such elements of greater flexibility may be disposed in any desired number on the outer and/or inner surface.

Furthermore, the half-cups 11, 12 may be partly split in axial direction. In FIGS. 1 and 2 a slit 32 is provided in each instance on the longitudinal sides situated opposite each other of the securing element, although several such slits 32 may also be provided. In appropriate manner the slits 32 extend to the end facing the seal of the half-cups 11, 12. The divided collar 14 arising as a result can then be pressed better through the screw-on ring 14 against the outer surface of the pipe 1.

As only traction is exerted on the clamp portions 19, 20, these may be made relatively thin-walled, in such a manner that if required the arrangement of areas 30, 31 of greater flexibility or of slits 32 in the sleeve portions may be dispensed with.

If need be, the clamp portions 19, 20 could be disposed close to each other for the arrangement of two or more tensioning bolts 25, as a result of which the clamping surface is increased and thereby the power closure is improved.

With the embodiment according to FIGS. 3 and 4 it would also be possible to provide slits in the portion of the half-cups 11, 12 which protrude over the screw-on ring 16, these slits being staggered in relation to the slits 32 of the portion of the half-cups 11, 12 which faces the seal. In addition, it would be possible to arrange on the clamp portions 19, 20 separated from the half-cups 11, 12, portions of greater flexibility, inside also.

The securing element 10 may, for example, be produced as a casting. In this case it would be simple to provide slits 32 or parts of greater flexibility 30, 31 on the casting pattern, in such a manner that no further processing would be necessary.

The securing element 10a may, however, be made also from relatively thin metal plate, which is quite adequate for the absorption of the pushing forces. The clamp portions 19, 20 would be separate portions appropriately in this case. The collar 14 on the metal plate sleeve 10a may, for example, be secured by means of brazing.

It is essential for the described securing element 10, 10a that the transmission of the pushing forces from the screw-on ring 16 onto the collar 14 on the one hand, and from the half-cups 11, 12 onto the outer surface of the tube 1 should take place at different points. Indeed, the screw-on ring 16, because of the slanting shoulders 15 of the collar 14, also exerts a holding force, but this is limited in view of the narrow area conditions. This drawback is eliminated with the securing element 10 described, in that outside the screw-on ring 16 a clamping force can be produced that is so great that a reliable non-sliding arrangement is presented. Indeed, in this connection, it is necessary to make the perforation of the screw-on ring 16 so great that the half-cups 11, 12 find room between the external circumference of the pipe 1 and the internal periphery of the screw-on ring 16. The weakening of the screw-on ring 16 associated with this may be tolerated because of the small wall thickness that is necessary for the half-cups 11, 12, in particular when the screw-on ring 16 is made of a cast iron of greater toughness, e.g., spheroidal graphite iron. If need be, the wall thickness of the securing portion can be reduced further, if it consists only in one portion which has only one slit extending along the direction of the pipe axis, i.e. the two half-cups are joined together in one piece along one edge.

With the described securing element 10, 10a all the objects that are to be achieved by a good non-sliding arrangement for a spigot-and-socket joint are met: Greater security against pushing forces, bendability of the pipes, and good electrical connection. In addition, any supplementary processing is done away with, so that the tubes 1 can be shortened without drawbacks.

The assembly of the described securing element 10 is very simple. It is first of all inserted into the screw-on ring 16, and pushed together with this onto the spigot end 3 of the pipe 1. After the screw-on ring 16 has been screwed into the socket end 4, the clamp 19, 20 is securely clamped, and thus the non-sliding arrangement is fitted. Because of the reliable non-sliding arrangement it is possible, especially when the pipe dimensions are small, to screw together two or more pipes before laying, and to lower them down together into a pipe ducting trench, in such a manner that the width of the trench can be smaller and it is possible to dispense with corresponding troughs for the screwed sockets in the trench.

It has now been found that with the non-sliding arrangement according to FIGS. 1 to 4 it is possible without difficulty to hold together securely axially spigot-and-socket joints at operational pressures of 16 atmospheres nominal pressure. With greater pipe diameters, e.g. at a nominal diameter 300, however, the non-sliding arrangement is no longer perfectly ensured. This defective security occurs also when the securing element is provided internally with a roughening or grooving. This is not sufficient to improve considerably the friction closure that can be achieved by means of the contraction of the clamp.

Therefore, in order to produce a spigot-and-socket joint in such a manner that a movement of the pipe end in the securing element can be safely avoided in the case of still higher pressures and/or also greater pipe diameters, in a further embodiment of the invention the securing element is appropriately constructed in the upper section, at least partly, as a clamping grid, which is covered by the clamp. By this means it is achieved that in practical terms a positive locking is obtained between the securing element and the spigot end of the one pipe.

In the spigot-and-socket joint according to FIGS. 5 to 8, on the external periphery of the spigot end 3 of the pipe 1, a securing element 10b is mounted, onto which end facing the seal an abutment 14 has been fixed, e.g. welded on. The abutment 14 is appropriately constructed as a ring with a circular cross-section, and extends over the sleeve portion(s). The securing ring 16 constructed as a screw-on ring rests against the abutment 14. The portion of the securing element 10b protruding out of the screw-on ring 16 has a portion constructed as a clamping grid 13. Laid around this clamping (friction) grid portion 13 is a clamp 19, 20, whose tensioning lugs 21, 22 each have a perforation 23, 24 through which a screw bolt 25 with a nut 26 extends. By means of the clamp 19, 20, the said portion 13 of the securing element 10 is pressed against the external periphery of the spigot end 3 of the pipe 1.

By the term clamping grid 13 there is understood a netting-like portion of the upper section of the securing element 10b consisting of cross-bars and openings, whose cross-bars come forward at least partly on one side. Suitable, for example, as a clamping grid is a material described as a stretching grid, which may be produced direct from a metal sheet. By this means it is possible to construct the upper section at least partly as a clamping grid, which thus forms an integral section of the securing element 10b. As may be seen from FIG. 5, the exial expansion of the clamping grid 13 is rather smaller than that of the clamp 19, 20, i.e. the transition from the clamping grid 13 onto the smooth-walled portion of the securing element is covered by the clamp 19, 20. By this means it is achieved that not only on the clamping grid 13, but also on the transition portion, a pressure is applied, for the crosswires of the clamping grid 13 are pressed into the surface of the pipe 1. As a result there arises at the clamping area of the securing element 10b practically a positive locking which permits the transmission of very great axial forces without shifting the spigot end 3 of the pipe in the securing element 10b.

The clamp 19, 20 may be constructed in various ways, e.g. according to FIG. 5, with two portions and and two tension rods 25, 26. The clamp may, however, be constructed also in one or more parts. Then as many tension rods 25, 26 are required as there are parts of the clamp. In the case of large diameters it is also possible to make the clamp so wide that on the tensioning lugs in axial direction two and more tension rods 25, 26 are arranged side by side. The securing sleeve 10b is divided axially and is in one piece according to FIG. 5, as is also the abutment 14. However, it is also possible to subdivide the securing sleeve 10b axially twice or several times, in which event the abutment ring 14 may be subdivided in the same way or also be left in one piece.

In FIG. 7 a representation is given of a non-sliding arrangement whose construction in the area of the clamping grid 13 deviates from the construction according to FIG. 5. The securing sleeve 10b has here in its upper portion openings 29 into which stop cams 28 connected with the clamp 19 engage. The clamping grid 13 forms as in FIG. 5 an integral portion of the securing element 10b. By means of the stop cams 28 it is achieved that the transition zone of the clamping grid 13 is partly balanced in the smooth-walled portion of the securing element 10b, in that a part of the axial forces is led via the clamp 19, 20 and the stop cams 28 directly into the smooth-walled section of the securing element 10b.

The other reference figures in FIG. 7 agree with those of FIGS. 5 and 6 and accordingly will no longer be dealt with.

In FIG. 8 a further form of embodiment of the non-sliding arrangement is represented. The securing element 10b consists here in a smooth-walled lower portion and in a clamping grid 13 separated from it, which lie front face one against the other. So that here a satisfactory non-sliding arrangement may be achieved, the upper portion of the securing element is provided with the openings 29 as in FIG. 7, into which the stop cams 28 of the clamp 19, 20 engage. On the edge of the clamp 19, 20 which lies opposite the stop cams 28, a supporting edge 33 is provided onto which the clamping grid 13 rests. The supporting edge 33 may extend as a continuous or as a divided edge around the internal circumference of the clamp sleeve 19, 20. Appropriately, the stop cams 28 and the supporting edge 33 have in the radial direction a height smaller than the wall thickness of the smooth-walled portion of the securing element 10b.

By means of the clamping grid 13 it is achieved that by means of the cross-wires of the clamping grid drepressions are made into the surface of the pipe 1, by means of which a positive locking between the securing element 10b and the pipe 1 is practically achieved.

In FIG. 8, a plug-in socket connection is represented which deviates from the screwed socket connection represented in FIGS. 5 and 7. In this, the socket end 4 has a holding flange 40 onto which screw hooks 41 with nuts 42 engage. The screw hooks 41 pass through perforations 43 of the securing ring 16 and hold it firmly in axial direction. The securing ring 16 is supported by the abutment and has a number of interruptions 44.

The socket end 4 has an internal flange 45 which defines an annular space designed to receive the soft seal 6. As a result of the place-saving manner of construction, the described non-sliding arrangements may be used practically with all spigot-and-socket joints.

The securing element 10b is appropriately made of metal plate, e.g. about 2.0 to 2.5 mm thick, of which a part is formed as a clamping grid 13. It is also possible to make the clamping grid 13 separately and to join it with the smooth-walled portion of the securing element 10b, e.g. by welding or brazing. The thin-walled securing element 10b adapts itself without difficulty to the unevennesses of the external outline of the pipe.

The securing element can, instead of being made of metal plate, be made as a casting e.g. of ductile cast iron, such as spheroidal graphite iron or the like. When using a casting the securing element may be preferably constructed according to the form of embodiment of FIG. 8, i.e. with separate clamping grid 13.

Furthermore, the securing element 10b has the same advantages as the securing elements 10 and 10a described earlier, i.e., when using them the bendability of the the spigot-and-socket joint, a satisfactory electric connection or transition, and easy laying of the pipe ducting are ensured.

What is claimed is:

1. In a deflectable spigot and socket connection of the type wherein the spigot end of a first pipe is held within and surrounded by the socket end of a second pipe, wherein a sealing ring is positioned between the external surface of the spigot end of said first pipe and the internal surface of the socket end of said second pipe to thereby form a fluid seal therebetween, wherein a securing ring is positioned between the external surface of the spigot end of said first pipe and the internal surface of the socket end of said second pipe, said securing ring having an end which projects towards said sealing ring and including means for fixedly positioning said securing ring with respect to the internal surface of the socket end of said second pipe, the improvement wherein an elongated sleeve-like securing element is positioned between the external surface of the spigot end of said first pipe and the internal surface of said securing ring, said elongated securing element having a first end which projects towards said sealing ring so as to maintain said sealing ring in sealing relationship with the internal surface of the socket end of said second pipe and the external surface of the spigot end of said first pipe, and a second end which extends away from said connection a greater distance than does said securing ring, said first end of said securing element including an abutment surface against which said end of said securing ring which projects towards said sealing ring abuts so as to maintain said securing element in position, and clamping means for clamping said second end of said securing element to the pipe which includes said spigot end, said securing ring and said securing element being so constructed and arranged so as to allow deflectability between said spigot and socket connection.

2. The connection of claim 1 wherein said elongated sleeve-like securing element includes longitudinally-extending slits to increase the flexibility thereof.

3. The connection of claim 1 wherein said sleeve-like securing element is in the form of two half-cups.

4. The connection of claim 3 wherein each said half-cups include tensioning lugs with hole means therein at opposite sides thereof, and wherein said clamping means comprises bolt means which pass through the hole means in adjacent lugs of the two half-cups, and nut means attached to the ends of each bolt means.

5. The combination of claim 4 wherein said half-cups include friction grids on the internal surfaces thereof in contact with said pipe which includes said spigot end.

6. The connection of claim 1 wherein said clamping means comprises a ring-like clamp which surrounds a portion of the second end of said elongated sleeve-like securing element.

7. The connection of claim 6 wherein said sleeve-like securing element is in the form of two half cups, said half-cups include friction grids on the internal surfaces thereof in contact with said pipe which includes said spigot end.

8. The connection of claim 7 wherein said friction grids are located on the internal surface of said half-cups opposite said portion of the second end of said elongated sleeve-like securing element which is surrounded by said ring-like clamp.

9. The connection of claim 8 wherein said friction grids are in the form of roughened portions of said securing element, with cross bars projecting away therefrom so as to contact said pipe which includes said spigot end.

10. The connection of claim 3 wherein said sleeve-like securing element includes means forming apertures therein adjacent said clamping means, wherein said clamping means is in the form of a ring-like clamp, and wherein said ring-like clamp includes cams which are engageable with said means forming said apertures.

11. The connection of claim 10 wherein the internal surface of said securing element includes a friction grid thereon for engagement with said external surface of said pipe which includes said spigot end.

12. The connection of claim 10 wherein said securing element includes a smooth walled portion and a friction grid on the internal surface thereof for engagement with the pipe which includes said spigot end, wherein said ring-like clamp includes a supporting edge at its end opposite said cams which are directed towards said pipe, and wherein said cams and said supporting edge extend towards said pipe a distance which is smaller than the thickness of said sleeve-like securing element.

13. The connection of claim 12 wherein the sleeve-like securing element includes means defining a gradual transition between the friction grid and the remaining portion of said element.

14. The connection of claim 1 wherein said sleeve-like securing element includes recesses therein to provide increased flexibility.

15. The connection of claim 3 wherein said means for fixedly positioning said securing ring with respect to said internal surface of the socket end of said second pipe comprises spiral threads on the external surface thereof which interengage with spiral threads on the internal surface of said socket end of said second pipe.

16. The connection of claim 1 wherein said sleeve-like securing element includes flat portions on the external surface thereof to provide increased flexibility.

17. In a deflectable spigot and socket connection of the type wherein the spigot end of a first pipe is held within the socket end of a second pipe, wherein a sealing ring is positioned between the external surface of the spigot end of said first pipe and the internal surface of the socket end of said second pipe, wherein said socket end includes means forming a generally C-shaped chamber therein facing said first pipe, said sealing ring being positioned within said chamber so as to sealingly contact both the outer surface of said first pipe and said means forming said generally C-shaped chamber, a securing ring, wherein said socket end also includes a flange extending in a direction away from said sealing ring and wherein a multiplicity of screw hooks are positioned for interengaging said flange of said socket end of said second pipe and for fixedly positioning said securing ring with respect to said flange, the improvement wherein a sleeve-like securing element is positioned in clamping engagement with said first pipe in spaced relation to said socket end of said second pipe, said securing element including a collar means at the end thereof closest to said socket end, said collar means including an abutment surface against which the securing ring abuts so as to maintain said securing element in fixed position with respect to the socket end of the second pipe, and clamping means for clamping said securing element to said first pipe, said means forming said generally C-shaped chamber and both said securing ring and said securing element being so constructed and arranged so as to allow deflectability between said spigot and socket connection.

18. The connection of claim 17 wherein said securing ring includes perforations therethrough, wherein each screw hook passes through a perforation, and wherein each screw hook is fitted with a nut for adjusting the positioning of the screw hook with the perforation so as to enable said surface of the screw hook to clampingly engage said flange.

19. The connection of claim 17 wherein said securing element includes means forming apertures therein adjacent said clamping means, wherein said clamping means is in the form of a ring-like clamp, wherein said ring-like clamp includes cams which are engageable with said means forming said apertures, wherein said securing element includes both a smooth wall portion and a separate friction grid ring positioned between said securing element and said pipe which includes said spigot end, wherein said ring-like clamp includes a supporting edge at its end opposite said cams which are towards said pipe, and wherein said cams and said supporting edge extend towards said pipe a distance which is smaller than the thickness of said securing element.

* * * * *